United States Patent [19]
Mitsche et al.

[11] 3,779,947
[45] Dec. 18, 1973

[54] METHOD OF CATALYST MANUFACTURE
[75] Inventors: Roy T. Mitsche, Island Lake; John C. Hayes, Palatine, both of Ill.
[73] Assignee: Universal Oil Products Company, Des Plaines, Ill.
[22] Filed: Dec. 30, 1971
[21] Appl. No.: 214,398

[52] U.S. Cl. ............................. 252/466 PT, 252/463
[51] Int. Cl...... B01j 11/08, B01j 11/22, B01j 11/06
[58] Field of Search ...................... 252/463, 466 PT

[56] References Cited
UNITED STATES PATENTS
1,879,022  9/1932  Barclay ........................ 252/463 X
3,193,349  7/1965  Mooi ............................. 252/463 X
3,692,701  9/1972  Box, Jr. ........................ 252/463 X Primary Examiner—C. F. Dees
Attorney—James R. Hoatson, Jr. et al.

[57] ABSTRACT

An acid salt of tin is admixed with an acid salt of aluminum in aqueous solution. The pH is adjusted to form a coprecipitate which is washed substantially free of acid anions. The washed precipitate is formed into shaped particles, dried and calcined, and impregnated with a platinum group metal.

6 Claims, No Drawings

METHOD OF CATALYST MANUFACTURE

The present invention relates to a method of manufacturing a catalyst comprising a platinum group metal component, a tin component and a porous carrier material, said catalyst having exceptional activity and stability when employed in a hydrocarbon conversion process requiring a catalyst having both a hydrogenation - dehydrogenation function and a cracking function.

Composites which exhibit a hydrogenation - dehydrogenation function and a cracking function are widely used in the petroleum and petrochemical industries to catalyze a wide spectrum of useful hydrocarbon conversion reactions including cracking, hydrogenation, hydrocracking, dehydrogenation, isomerization, cyclization, dehydrocyclization, and the like. The cracking function is generally associated with an acid-acting refractory inorganic oxide employed as a support or carrier material for catalytically active metallic components, such as the metals, or compounds of metals of Group VIII, which are typically responsible for the hydrogenation - dehydrogenation function.

In many cases, these catalysts are employed in processes where more than one hydrocarbon conversion reaction is taking place. Reforming is a classic example. The reforming of gasoline boiling range feed stocks is generally recognized as involving a number of octane-improving hydrocarbon conversion reactions requiring a multi-functional catalyst. In particular, the catalyst is designed to effect several octane-improving reactions with respect to paraffins and naphthenes — the feed stock components that offer the greatest potential for octane improvement. Thus, the catalyst is designed to effect isomerization, dehydrogenation, dehydrocyclization and hydrocracking of paraffins. Of these hydrocarbon conversion reactions, dehydrocyclization produces the greatest gain in octane value and is therefore a favored reaction. For naphthenes, the principal octane-improving reactions involve dehydrogenation and ring isomerization to yield aromatics of improved octane value. With most naphthenes being in the 65-80 F-1 clear octane range, the octane improvement, while substantial, is not as dramatic as in the case of the lower octane paraffins. Reforming operations thus employ a multi-functional catalyst designed to provide a most favorable balance between the aforementioned octane-improving reactions to yield a product of optimum octane value, said catalyst having at least one metallic dehydrogenation component and an acid-acting hydrocracking - isomerization component.

However, even with the achievement of the desired balance between the octane-improving reactions, problems persist relating principally to undesirable side reactions, which, although minimal, cumulatively contribute to carbon formation, catalyst instability and product loss. Thus, demethylation occurs with the formation of excess methane; excessive hydrocracking produces light gases; cleavage or ring opening of naphthene results in the formation of low octane, straight-chain hydrocarbons; condensation of aromatics forms coke precursors and carbonaceous deposits; and the acid catalyzed polymerization of olefins and other polymerizable materials yields high molecular weight hydrocarbons subject to dehydrogenation and further formation of carbonaceous matter.

Accordingly, an effective reforming operation is dependent on the proper selection of catalyst and process variables to minimize the effect of undesirable side reactions for a particular hydrocarbon feed stock. However, this selection is complicated by the fact that there is an interrelation between reaction conditions relating to undesirable side reactions and desirable octane-improving reactions. Reaction conditions selected to optimize a particular octane-improving reaction may, and often do, also promote one or more undesirable side reactions. For example, as previously indicated, some hydrocracking is desirable since it produces lower boiling hydrocarbons of higher octane value than the parent hydrocarbons. But hydrocracking of lower boiling $C_6$–$C_8$ constituents is not desirable since it produces still lower boiling hydrocarbons such as butane, which are of marginal utility. It is this type of hydrocracking that is referred to as excessive hydrocracking and to be avoided. The extent and kind of hydrocracking is controlled by careful regulation of the acid-acting component of the catalyst and by the use of low hydrogen partial pressures. The latter follows from the fact that the hydrocracking reaction consumes hydrogen and that the reaction can therefore be controlled by limiting hydrogen concentration in the reaction media. Low hydrogen partial pressures have a further advantage in that the main octane-improving reactions, i.e., dehydrocyclization of paraffins and dehydrogenation of naphthenes, are net producers of hydrogen and, as such, are favored by low hydrogen pressures.

Catalysts comprising a supported platinum group metal, for example, platinum supported on alumina, are particularly known for their activity and selectivity in the conversion of naphtha feed stocks to high octane aromatics at reforming conditions. One of the principal objections to low pressure reforming relates to its effect on catalyst stability. This stems from the fact that low pressure operations tend to favor the aforementioned condensation and polymerization reactions believed to be the principal reactions involved in the formation of coke precursors and carbon deposits so detrimental to catalyst stability.

More recently, the industry has turned to certain bimetallic catalysts to make low pressure reforming and all the advantages attendant therewith a reality. In particular, a tin component included with the platinum group metal component on an alumina support or carrier material has been found to promote activity, selectivity and particularly stability of the catalyst in a low pressure reforming operation.

It is an object of the present invention to provide an improved method of manufacturing a catalyst containing a platinum group metal component and a tin component in combination with an alumina carrier material.

The present invention embodies a method of catalyst manufacture which comprises admixing an acid salt of tin with an acid salt of aluminum in aqueous solution, adjusting the pH of the solution to from about 7.5 to about 9.0 and forming a coprecipitate, washing the coprecipitate substantially free of acid anions at a pH of from about 7.5 to about 9.0, compressing the washed coprecipitate into shaped particles and drying the particles to contain from about 15 to about 25 wt. percent volatile matter, calcining the dried particles and impregnating the calcined particles with a platinum group metal.

Pursuant to the present invention, in the manufacture of a catalyst comprising a tin component dispersed in an alumina carrier material as a promotor metal for a catalytically active platinum group metal component, the tin component is incorporated in the alumina carrier material by means of coprecipitation therewith from a common aqueous solution. Accordingly, a soluble acid salt of tin, preferably a soluble tin halide such as stannous chloride, stannous chloride dihydrate, stannous bromide, stannous fluoride, stannous iodide, stannic chloride, stannic chloride trihydrate, stannic chloride tetrahydrate, stannic chloride pentahydrate, etc., or other acid salts like stannous nitrate, stannic nitrate, stannous sulfate, stannic chloride diamine, stannic acetate, and the like, is prepared in aqueous solution. The acid salt of tin is used in a relatively small concentration — sufficient to yield a final catalyst product comprising from about 0.1 to about 5.0 wt. percent tin. The tin salt may be first prepared in aqueous solution and an acid salt of aluminum added thereto, or the tin salt may be added to a previously prepared aqueous aluminum salt solution. In any case, the tin and aluminum salts are prepared in aqueous solution. The aluminum salt employed as a precursor for the alumina support or carrier material is preferably aluminum chloride or other aluminum halide including aluminum bromide, aluminum iodide, aluminum fluoride, aluminum chlorate, etc. Other suitable salts of aluminum include aluminum sulfate, aluminum nitrate, aluminum acetate, and the like.

Coprecipitation is effected at a pH of from about 7.5 to about 9.0. The pH of the aqueous solution is preferably adjusted by the addition of ammonium hydroxide thereto, the addition being slow and with vigorous mixing to insure the desired dispersion of the tin component in the alumina. When precipitation is complete, the precipitate is recovered, suitably by filtration, and the precipitate washed one or more times with water to separate substantially all of the acid anions therefrom. The water-washing is effected at a pH of from about 7.5 to about 9.0, for example, by the addition of ammonia or ammonium hydroxide to the wash water. The precipitate is suitably washed when the water-washings analyze less than about 10 parts per million chloride, or other acid anion.

In accordance with the method of this invention, the washed precipitate is compressed into shaped particles and dried to contain from about 15 to about 25 wt. percent volatile matter as evidenced by loss of weight upon ignition at 500°C. Preferably, the washed precipitate is formed into extrudate particles of desired size. Binders such as starch, polyvinyl alcohol, methylcellulose, graphite, etc., may be employed if so desired, suitably in a concentration to comprise from about 1 to about 5 wt. percent of the extrudable mass. In any case, the dried particles are calcined prior to impregnation with a platinum group metal. Thus, the particles are subjected to calcination at a temperature of from about 800° to about 1,400°F. The time of calcination will vary with the temperature but need not necessarily be in excess of about 10 hours. Usually, calcination is effected in an oxidizing atmosphere such as air although in some cases a reducing atmosphere, such as hydrogen, or an inert atmosphere, such as nitrogen, may be employed.

Although the present invention is directed to the manufacture of a catalyst containing a platinum group metal, i.e. platinum, palladium, rhodium, ruthenium, osmium and iridium, platinum is a preferred catalyst component. The platinum group metal component is incorporated in the catalyst composite utilizing impregnating techniques known to the art. For example, the tin-containing alumina carrier material is suspended, dipped, soaked or otherwise immersed in an aqueous solution of a soluble platinum group metal compound. Suitable compounds include platinum chloride, chloroplatinic acid, ammonium chloroplatinate, dinitrodiamino platinum, palladium chloride, chloropalladic acid, and the like. Utilization of a platinum group metal combined with halogen, such as chloroplatinic acid, is preferred as it facilitates the incorporation of the platinum group metal component as well as the desired halogen component. Hydrogen chloride is also generally added to the impregnating solution to further facilitate incorporation of both the platinum group metal and the halogen component in the catalyst composite. The tin-containing alumina is preferably maintained in contact with the impregnating solution at ambient temperature conditions for a brief period, preferably for at least about 30 minutes, and the impregnating solution thereafter evaporated substantially to dryness. For example, a volume of tin-containing alumina particles is immersed in a substantially equal volume of impregnating solution in a steam jacketed rotary dryer and tumbled therein for a brief period at about room temperature. Steam is thereafter applied to the dryer jacket to expedite evaporation of the impregnation solution and recovery of substantially dry impregnated material.

The final catalyst composite generally will be dried at a temperature of from about 200° to about 600°F. over a period of from about 2 to about 24 hours or more, and finally calcined at a temperature of from about 700° to about 1,100°F. in an air atmosphere for a period of from about 0.5 to about 10 hours in order to convert the metallic components substantially to the oxide form. In the case where a halogen component is utilized in the catalyst, best results are generally obtained when the halogen content of the catalyst is adjusted during the calcination step by including a halogen or a halogen-containing compound in the air atmosphere utilized. In particular, when the halogen component of the catalyst is chlorine, it is preferred to use a mole ratio of $H_2O:HCl$ of from about 20:1 to about 100:1 during at least a portion of the calcination step in order to adjust the final chlorine content of the catalyst to a range of from about 0.5 to about 1.2 wt. percent.

While it is not essential, it is preferred that the resultant calcined catalytic composite be treated in a substantially water-free reducing atmosphere prior to use in the conversion of hydrocarbons. This step is designed to insure a uniform and finely divided dispersion of the platinum and tin components throughout the carrier material. Preferably, substantially pure and dry hydrogen is used as the reducing atmosphere in this step. The calcined catalyst is suitably treated in the reducing atmosphere at a temperature of from about 800° to about 1,200°F. for a period of from about 0.5 to about 10 hours or more. This treatment may be performed in situ as part of a start-up sequence if precautions are taken to predry the plant to a substantially water-free state and if substantially water-free hydrogen is used.

The catalyst may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° to about 1,100°F. or more. It is generally a good practice to perform this presulfiding step under substantially water-free conditions.

Although the catalyst composition of this invention is most suitable for reforming, it may be used to promote other reactions including dehydrogenation of specific hydrocarbons or hydrocarbon fractions, isomerization of specific hydrocarbons or hydrocarbon fractions, destructive hydrogenation or hydrocracking of larger hydrocarbon molecules such as those occurring in the kerosine and gas oil boiling range, and the oxidation of hydrocarbons to produce first, second and third stage oxidation products. Reaction conditions employed in the various hydrocarbon conversion reactions are those heretofore practiced in the art. For example, alkylaromatic isomerization reaction conditions include a temperature of from about 32° to about 1,000°F., a pressure of from about atmospheric to about 1,500 psig, a hydrogen to hydrocarbon mole ratio of from about 0.5:1 to about 20:1 and a liquid hourly space velocity of from about 0.5 to about 20. Likewise, typical hydrocracking reaction conditions include a pressure of from about 500 to about 3,000 psig, a temperature of from about 390° to about 930°F., a liquid hourly space velocity of from about 0.1 to about 10, and a hydrogen circulation rate of from about 1,000 to about 10,000 SCF/BB1.

The following example is presented in illustration of the method of this invention and is not intended as an undue limitation on the generally broad scope of the invention as set out in the appended claims.

EXAMPLE

In the preparation of a catalyst comprising platinum supported on alumina containing about 0.5 wt. percent tin, about 3.12 grams of stannic chloride pentahydrate is first added to a vigorously stirred solution of 1,000 grams of aluminum chloride hexahydrate in 1,500 milliliters of water. The pH of the resulting solution is then adjusted in the 7.5-9.0 range by the slow addition of approximately 435 grams of dilute ammonium hydroxide with continued stirring. The coprecipitate which forms is recovered by filtration and the filtered cake washed one or more times with water containing sufficient ammonium hydroxide to maintain the pH in the 7.5-9.0 range. The washing is continued until the washings analyze less than about 10 ppm chloride. The filtered cake is thereafter extruded, cut into ¼-inch segments and dried to a volatile matter content of about 20 wt. % as evidenced by a loss on ignition at 500°C. The dried extrudate particles are then calcined in air at a temperature of about 600°C. for approximately 2 hours and thereafter impregnated with an aqueous chloroplatinic acid solution to deposit about 0.375 wt. percent platinum thereon. Resulting composite is calcined in air for one hour at 150°C. and for one hour at 525°C. Prior to use, the calcined catalyst composite is treated in a stream of hydrogen for about 1 hour at 550°C.

We claim as our invention:

1. A method of hydrocarbon conversion catalyst manufacture which comprises:
   a. admixing an acid salt of tin in an amount to provide a final product containing from about 0.1 to about 5.0 wt. percent tin with an acid salt of aluminum in aqueous solution;
   b. adjusting the pH of the solution to an alkaline pH of from about 7.5 to about 9.0 and forming a coprecipitate;
   c. washing the precipitate substantially free of acid anions at an alkaline pH of from about 7.5 to about 9.0;
   d. compressing the washed precipitate into shaped particles and drying the particles to contain from about 15 to about 25 wt. percent volatile matter;
   e. calcining the dried particles at a temperature of from about 800° to about 1,400°F.; and
   f. impregnating the calcined particles with a platinum group metal.

2. The method of claim 1 further characterized in that said acid salt of tin is stannic chloride.

3. The method of claim 1 further characterized in that said acid salt of aluminum is aluminum chloride.

4. The method of claim 1 further characterized in that said pH is adjusted by the addition of ammonium hydroxide to said solution.

5. The method of claim 1 further characterized in that said platinum group metal is platinum.

6. The method of claim 1 further characterized in that said platinum group metal is utilized in an amount to provide a final product containing from about 0.25 to about 0.75 wt. percent platinum group metal.

* * * * *